(No Model.)
S. H. SHERMAN.
HOOF PAD.
No. 544,797.
Patented Aug. 20, 1895.
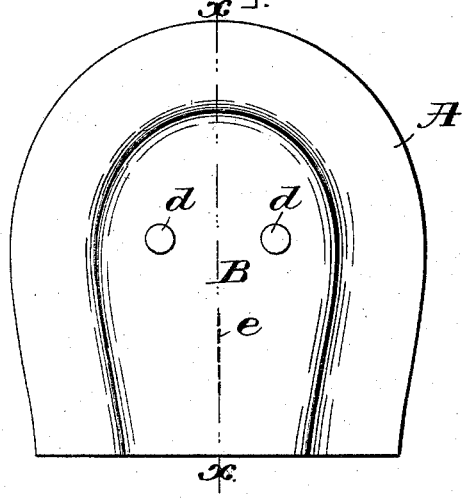
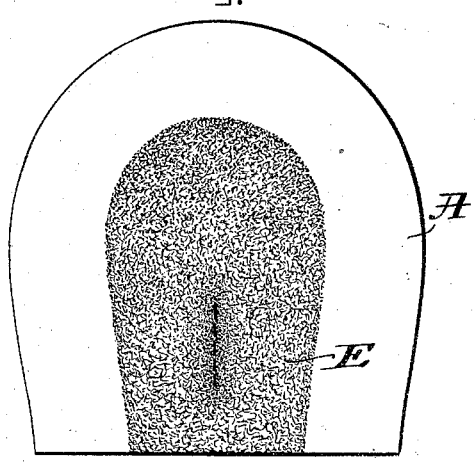
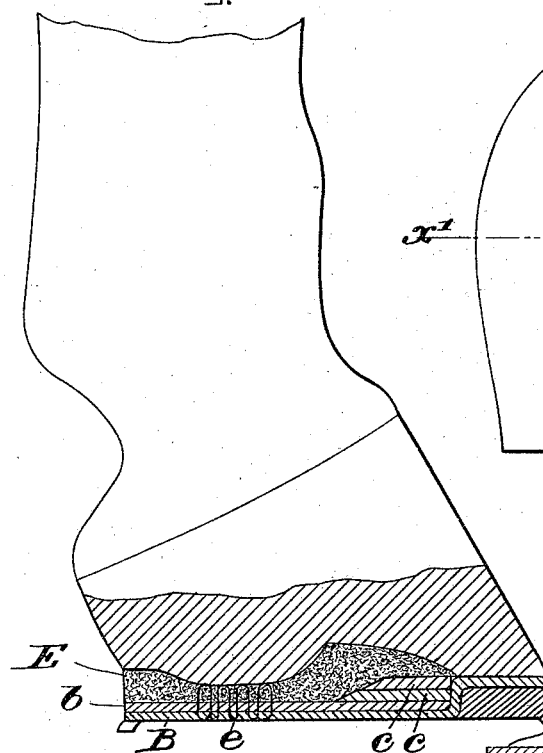
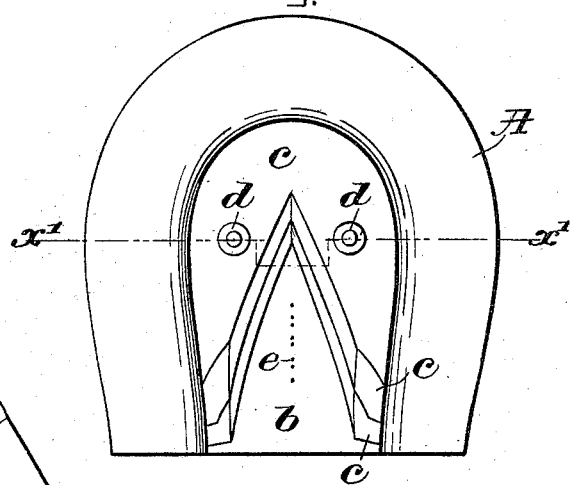
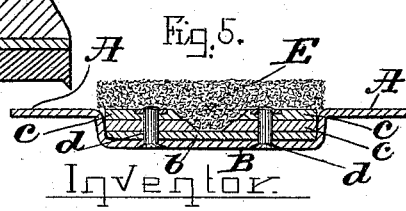
Witnesses.
Lauritz N. Möller
Thomas J. Drummond
Inventor.
Silas H. Sherman,
by Crosby & Gregory
attys

UNITED STATES PATENT OFFICE.

SILAS HENRY SHERMAN, OF WEYMOUTH, MASSACHUSETTS.

HOOF-PAD.

SPECIFICATION forming part of Letters Patent No. 544,797, dated August 20, 1895.

Application filed August 27, 1894. Serial No. 521,385. (No model.)

*To all whom it may concern:*

Be it known that I, SILAS HENRY SHERMAN, of Weymouth, county of Norfolk, State of Massachusetts, have invented an Improvement in Hoof-Pads, of which the following description, in connection with the accompanying drawings, is a specification, like letters on the drawings representing like parts.

This invention has for its object to provide an improved hoof-pad for horses, the nature and advantages of my improvements being hereinafter fully described, and pointed out in the claims.

In the drawings, Figure 1 is an under side view of a pad embodying my invention; Fig. 2, a top or plan view of the same; Fig. 3, a view similar to Fig. 2 with the cushion removed; Fig. 4, a longitudinal section of the pad, taken on the dotted line $xx$ of Fig. 1, the pad being shown in position upon the hoof; and Fig. 5, a cross-section on the dotted line $x'x'$ of Fig. 3, the cushion also being shown.

Referring to the drawings, my improved pad, as shown, is made preferably from leather or other substantially unyielding material, and consists of an outer rim portion A and a central body portion B, the said rim being shaped to fit the hoof and designed to be interposed between the hoof and the shoe and secured by the fastenings for the latter. The central body portion B is sunk below the level of the rim A, and is preferably of a size to completely fill the space inside of the shoe, and for the best results to a level substantially that of the bottom of the shoe, so that the latter and flat bottom of said body portion form in effect a broad flat surface, as best illustrated in Figs. 4 and 5, leaving no depression or concavity to cause the hoof to ball up in winter. To stiffen this broad flat bottom of the body B, and to prevent buckling or indenting of the same when the horse slips upon a stone, I have provided a stiffening sheet or layer $b$, applied to the said bottom inside the depression. Around the curved interior of the depression I preferably arrange one or more rands or equivalent devices $c$, (see Figs. 3, 4, and 5, wherein two are shown,) they preferably being shaped as illustrated in Fig. 3, although the shape of the same may be more or less varied within the scope of my invention. In practice the stiffener $b$ and rands $c$ are cemented together by rubber or other suitable cementitious compound, and are further secured together and to the body-bottom by one or more metallic fastenings or rivets $d$, as shown.

E is a cushion, shown as of thick felt, or it may be of other yielding and preferably moisture-holding material, arranged in the depression and upon the rands, (see Figs. 2 and 5,) said cushion, because of its thickness, rising preferably considerably above the level of the rim A. When the pad is applied to the hoof, this thick soft felt adapts itself to the irregularities in the bottom of the hoof and fills all parts thereof. The depressions in the hoof are usually so deep that to compress the felt sufficiently to cause it to fill the said depression would cause the felt to press excessively upon the projecting frog $f$. To avoid this I have herein run a line of stitches $e$ through the felt and body-bottom at the rear center of the depression to draw the felt down into the cavity formed within and by the rands, and thus form a pocket to receive and yieldingly support the frog, yet enabling the other parts of the cushion to fill the deeper portions of the hoof, as described. In lieu of the stitches $e$, I may employ any other suitable fastener capable of drawing down the felt to form a pocket for the frog. The felt cushion is exposed at the heel of the hoof, so that it may absorb more or less moisture while the horse is in use, and also to enable the cushion to be saturated when necessary to moisten the hoof. By making the bottom of the depression flat and stiffening the same by the layer or sheet, applied as shown, the shoe may be filled to prevent balling and yet be sufficiently stiff to resist any tendency to buckle when the horse steps upon a stone. By the use of the rands within the depression I am enabled to form a pocket in the cushion for the frog and at the same time leave the edges of such a height as to completely fill the deeper portions of the frog.

The pad is preferably molded from leather, and is light, stiff, and sufficiently unyielding to enable it to be placed between the hoof and the shoe without danger of losing the nails from the shoe.

My invention is not limited to the particular shape and construction of pad herein shown, as the same may be varied without departing from the spirit and scope of my invention.

No peculiarly-constructed shoe is required in the use of my pad, and the latter may be equally well applied with a bar-shoe.

I claim—

1. The herein described hoof pad, the same consisting of a substantially unyielding rim of a size and shape to fit the hoof, and adapted to be interposed between the latter and the shoe and secured by the fastenings for the shoe, a central sunken flat-bottom body portion filling the shoe and containing a depression, the edges of said flat-bottom body portion lying close to the curved inner edge of the shoe to thereby fill the latter, a hoof supporting cushion in and filling said depression, to at or above the level of the top of said rim, and a flat stiffening piece covering the entire flat bottom of the body portion to prevent buckling, substantially as described.

2. The herein described hoof pad, the same consisting of a substantially unyielding rim of a size and shape to fit the hoof, and adapted to be interposed between the latter and the shoe and secured by the fastenings of the shoe, a central sunken flat-bottom body portion filling the shoe and containing a depression; one or more rands arranged in the bottom of and around the curved edge of said depression, and a cushion in said depression and resting at its center upon the body bottom and around its edge upon the said rand or rands to thereby raise the edges of said cushion without rounding or curving the edges of the body bottom, substantially as described.

3. The herein described hoof pad, the same consisting of a substantially unyielding rim of a size and shape to fit the hoof, and adapted to be interposed between the latter and the shoe and secured by the fastenings for the latter, a body portion sunk below the said rim to leave a depression, one or more rands around the edge of said depression, a cushion arranged in said depression and upon said rands, and a fastener to draw said cushion down into the depression within said rands to form a depression in the upper surface of the cushion for the hoof frog, substantially as described.

4. The herein described hoof pad, the same consisting of a rim of a size and a shape substantially that of the hoof and adapted to be interposed between the latter and the shoe and secured by the fastenings for the latter, an integral body portion sunk below said rim to form a depression, said body portion substantially filling the said shoe to at or near the face of the latter and having a substantially flat bottom, a reinforcing and stiffening sheet in the said depression and upon the bottom of said body portion, one or more rands arranged around the curved side of said depression, a felt cushion arranged upon the said rands, and a fastener drawing the said cushion into the depression within said rands, substantially as described.

5. The herein described hoof pad, the same consisting of a rim of a size and shape substantially that of the hoof and adapted to be interposed between the latter and the shoe and secured by the fastenings for the latter, an integral body portion sunk below said rim to form a depression, said body portion substantially filling the said shoe to at or near the face of the latter and having a substantially flat bottom, a reinforcing and stiffening sheet in the said depression and upon the bottom of said body portion, one or more rands arranged around the curved side of said depression, metallic fastening devices uniting the said rands and stiffener to the said body bottom, a felt cushion arranged upon the said rands, and fastening stitches drawing the said cushion into the depression within said rands, substantially as described.

In testimony whereof I have signed my name to this specification in the presence of two subscribing witnesses.

SILAS HENRY SHERMAN.

Witnesses:
FREDERICK L. EMERY,
AUGUSTA E. DEAN.